United States Patent
Okazaki et al.

(10) Patent No.: US 11,851,558 B2
(45) Date of Patent: Dec. 26, 2023

(54) METHACRYLIC RESIN COMPOSITION, MOLDED ARTICLE, AND METHOD OF PRODUCING METHACRYLIC RESIN COMPOSITION

(71) Applicant: SUMITOMO CHEMICAL COMPANY, LIMITED, Tokyo (JP)

(72) Inventors: Ryosuke Okazaki, Ehime (JP); Makoto Manabe, Ehime (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 243 days.

(21) Appl. No.: 17/210,994

(22) Filed: Mar. 24, 2021

(65) Prior Publication Data

US 2021/0301120 A1 Sep. 30, 2021

(30) Foreign Application Priority Data

Mar. 26, 2020 (JP) .................. 2020-056291
Nov. 25, 2020 (JP) .................. 2020-195056

(51) Int. Cl.
*C08L 33/10* (2006.01)
*C08F 220/14* (2006.01)

(52) U.S. Cl.
CPC ............ *C08L 33/10* (2013.01); *C08F 220/14* (2013.01)

(58) Field of Classification Search
CPC .......... C08L 33/10; C08L 33/12; C08L 33/14; C08L 2205/025; C08F 220/14; C08F 2/001; C08F 2/02; C08F 2/38; C08F 265/06

See application file for complete search history.

(56) References Cited

U.S. PATENT DOCUMENTS 8,617,708 B2  12/2013  Murakami et al.
2012/0196127 A1*  8/2012  Murakami .............. C08F 2/001
                                            428/402

(Continued)

FOREIGN PATENT DOCUMENTS

EP    0636942    *  7/1994
EP    2927249 A1    10/2015
(Continued)

OTHER PUBLICATIONS

Translation of JP 2002-202626 (Year: 2002).*
Extended European Search Report in connection to European Patent Application No. 21157106.2, dated Jul. 30, 2021.

*Primary Examiner* — Robert C Boyle
(74) *Attorney, Agent, or Firm* — Meunier Carlin & Curfman LLC (57) ABSTRACT

There are provided a methacrylic resin composition capable of producing a molded article excellent in a Charpy impact strength, and the like. Provided is a methacrylic resin composition containing a methacrylic resin (A) and a methacrylic resin (B), and satisfying the following requirements (1) to (4): (1) each of the methacrylic resin (A) and the methacrylic resin (B) has a structural unit derived from a methacrylic acid ester, and a content of the structural unit derived from the methacrylic acid ester contained in the methacrylic resin composition is 98.0% by mass or more with respect to a total content of 100% by mass of all structural units contained in the methacrylic resin composition; (2) W1 is 10 to 25; (3) W2 is 3 to 15; and (4) a ratio (Mw/Mn) of a mass average molecular weight of the methacrylic resin composition to a number average molecular weight of the methacrylic resin composition is 2.0 to 3.2.

9 Claims, 2 Drawing Sheets

(56) References Cited

U.S. PATENT DOCUMENTS

2016/0185884 A1    6/2016  Yamamori et al.
2016/0370721 A1*  12/2016  Sugama ............. G03G 9/08795
2017/0190896 A1    7/2017  Yamamori et al.
2018/0020171 A1    1/2018  Miyake et al.
2020/0172646 A1*  6/2020  Okazaki ................ C08F 220/14

FOREIGN PATENT DOCUMENTS

| | | | |
|---|---|---|---|
| EP | 3524872 A1 | | 8/2019 |
| JP | 2002-202626 | * | 7/2002 |
| JP | 2011-105810 A | | 6/2011 |
| JP | 2016-8237 A | | 1/2016 |
| WO | 2014/088082 A1 | | 6/2014 |
| WO | 2018/066393 A1 | | 4/2018 |

* cited by examiner

METHACRYLIC RESIN COMPOSITION, MOLDED ARTICLE, AND METHOD OF PRODUCING METHACRYLIC RESIN COMPOSITION

BACKGROUND OF THE INVENTION

Field of the Invention

The present invention relates to a methacrylic resin composition, a molded article, and a method of producing the methacrylic resin composition.

Description of the Related Art

A methacrylic resin composition has been used as a substitute for inorganic glass, for example, as a material for a molded article constituting an automobile (in particular, a cover of a tail lamp or a head lamp) because it is excellent in transparency and heat resistance. A methacrylic resin composition having various characteristics has been developed.

For example, in JP-A-2016-008237, a methacrylic resin composition that can be used as a material for a molded article for an automobile is described, and it is described that the methacrylic resin composition contains two methacrylic resins different in peak molecular weight and satisfies a predetermined condition.

SUMMARY OF THE INVENTION

In recent years, a reduction in weights of parts constituting an automobile has been required to improve fuel efficiency.

Therefore, it is preferable that a molded article constituting an automobile is thin. In addition, the molded article constituting an automobile may also become large to meet a requirement for a design or the like. However, as the molded article becomes thinner and larger, an impact strength thereof tends to be decreased.

Therefore, a material for a molded article capable of producing a molded article having a desired level of an impact strength is required.

However, in a case where the methacrylic resin composition according to the related art is used for a molded article, a Charpy impact strength of the molded article is not sufficient.

Therefore, a methacrylic resin composition capable of producing a molded article excellent in a Charpy impact strength; a molded article containing the methacrylic resin composition; and a method of producing the methacrylic resin composition are required.

As a result of conducting intensive studies to solve the above problems, the present inventors found that a methacrylic resin composition satisfying specific requirements (1) to (4) solves the above problems, thereby completing the present invention. Accordingly, the present invention provides the following inventions. The present invention is not limited to the following inventions.

[1] A methacrylic resin composition containing a methacrylic resin (A) and a methacrylic resin (B), and satisfying the following requirements (1) to (4):
(1) each of the methacrylic resin (A) and the methacrylic resin (B) has a structural unit derived from a methacrylic acid ester, and a content of the structural unit derived from the methacrylic acid ester contained in the methacrylic resin composition is 98.0% by mass or more with respect to a total content of 100% by mass of all structural units contained in the methacrylic resin composition;
(2) W1 is 10 to 25, in which W1 is a ratio (%) of a peak area from a starting point to a molecular weight of 30,000 to a peak area from the starting point to an end point in a differential molecular weight distribution curve of the methacrylic resin composition;
(3) W2 is 3 to 15, in which W2 is a ratio (%) of a peak area from a molecular weight of 300,000 to the end point to a peak area from the starting point to the end point in the differential molecular weight distribution curve of the methacrylic resin composition; and
(4) a ratio (Mw/Mn) of a mass average molecular weight of the methacrylic resin composition to a number average molecular weight of the methacrylic resin composition is 2.0 to 3.2.
[2] The methacrylic resin composition according to [1], wherein a ratio (Mw/Mn) of the mass average molecular weight of the methacrylic resin composition to the number average molecular weight of the methacrylic resin composition is 2.4 to 3.2.
[3] The methacrylic resin composition according to [1] or [2], wherein W2 is 5 to 10.
[4] The methacrylic resin composition according to any one of [1] to [3], wherein a content of one of the methacrylic resin (A) and the methacrylic resin (B) and a content of the other of the methacrylic resin (A) and the methacrylic resin (B) are 25% by mass to 35% by mass and 65% by mass to 75% by mass, respectively, with respect to a total content of 100% by mass of the methacrylic resin (A) and the methacrylic resin (B).
[5] The methacrylic resin composition according to any one of [1] to [4], wherein the methacrylic acid ester is methyl methacrylate.
[6] The methacrylic resin composition according to any one of [1] to [5], wherein each of the methacrylic resin (A) and the methacrylic resin (B) has a structural unit derived from an acrylic acid ester.
[7] The methacrylic resin composition according to [6], wherein the acrylic acid ester is methyl acrylate.
[8] A molded article containing the methacrylic resin composition according to any one of [1] to [7].
[9] A method of producing the methacrylic resin composition according to any one of [1] to [7], the method including:
a first polymerization step of feeding, to a first complete mixing reaction tank, a raw material composition (A) containing a raw material monomer (A) containing 98.0% by mass or more of a methacrylic acid ester, a polymerization initiator (A), and a chain transfer agent (A), subjecting the raw material composition (A) to continuous bulk polymerization in the first complete mixing reaction tank, and extracting, from the first complete mixing reaction tank, an intermediate composition (A) obtained thereby; and
a second polymerization step of feeding, to a second complete mixing reaction tank, a raw material composition (B) containing a raw material monomer (B) containing 98.0% by mass or more of a methacrylic acid ester, a polymerization initiator (B), and a chain transfer agent (B), and the intermediate composition (A) extracted in the first polymerization step, further subjecting the raw material composition (B) and the intermediate composition (A) to continuous bulk polymerization in the second complete mixing reaction tank, and extracting, from the second complete mixing reaction tank, a methacrylic resin composition obtained thereby, the method satisfying the following requirements (11) and (12):

$$1.5 \leq L^A/L^B \leq 1.9; \text{ and} \quad (11)$$

$$0.5 \leq S^B/S^A \leq 2.5, \quad (12)$$

wherein $L^A$ represents a concentration (% by mass) of the polymerization initiator (A) in the raw material composition (A), $L^B$ represents a concentration (% by mass) of the polymerization initiator (B) in a mixture of the raw material composition (B) and the intermediate composition (A), $S^A$ represents a concentration (% by mass) of the chain transfer agent (A) in the raw material composition (A), and $S^B$ represents a concentration (% by mass) of the chain transfer agent (B) in the mixture of the raw material composition (B) and the intermediate composition (A).

[10] The method according to [9], further satisfying the following requirements (13) and (14):

$$25 \geq \theta^1 \geq 45; \text{ and} \quad (13)$$

$$10 \leq \theta^2 \leq 25, \quad (14)$$

wherein $\theta^1$ represents a retention time (min) in the first complete mixing reaction tank in the first polymerization step, and $\theta^2$ represents a retention time (min) in the second complete mixing reaction tank in the second polymerization step.

According to the present invention, it is possible to provide a methacrylic resin composition capable of producing a molded article excellent in a Charpy impact strength; a molded article containing the methacrylic resin composition; and a method of producing the methacrylic resin composition.

DETAILED DESCRIPTION OF THE PREFERRED EMBODIMENTS

In the present specification, unless otherwise specified, a numerical range of "A to B" means "A or more and B or less".

In the present specification, a structural unit derived from a certain monomer may be simply referred to as a "monomer unit" using the name of the monomer.

[1. Methacrylic Resin Composition]

A methacrylic resin composition of the present invention is a composition containing a methacrylic resin (A) and a methacrylic resin (B), and satisfying the following requirements (1) to (4):

(1) each of the methacrylic resin (A) and the methacrylic resin (B) has a structural unit derived from a methacrylic acid ester, and a content of the structural unit derived from the methacrylic acid ester contained in the methacrylic resin composition is 98.0% by mass or more with respect to a total content of 100% by mass of all structural units contained in the methacrylic resin composition;

(2) W1 is 10 to 25, in which W1 is a ratio (%) of a peak area from a starting point to a molecular weight of 30,000 to a peak area from the starting point to an end point in a differential molecular weight distribution curve of the methacrylic resin composition;

(3) W2 is 3 to 15, in which W2 is a ratio (%) of a peak area from a molecular weight of 300,000 to the end point to a peak area from the starting point to the end point in the differential molecular weight distribution curve of the methacrylic resin composition; and (4) a ratio (Mw/Mn) of a mass average molecular weight of the methacrylic resin composition to a number average molecular weight of the methacrylic resin composition is 2.0 to 3.2.

The methacrylic resin composition of the present invention satisfies all the requirements (1), (2), (3), and (4), such that the methacrylic resin composition can maintain a Charpy impact strength described below in detail (in particular, in Examples) at a desired level.

[1.1. Requirement (1)]

The methacrylic resin composition of the present invention contains a methacrylic resin (A) and a methacrylic resin (B). In the present specification, unless otherwise specified, the matter related to the "methacrylic resin" applies to both the methacrylic resin (A) and the methacrylic resin (B) contained in the methacrylic resin composition of the present invention.

The methacrylic resin has a structural unit derived from a methacrylic acid ester (hereinafter, may be referred to as a methacrylic acid ester unit). Examples of the methacrylic acid ester can include alkyl methacrylates such as methyl methacrylate, ethyl methacrylate, 2-ethylhexyl methacrylate, lauryl methacrylate, benzyl methacrylate, and cyclohexyl methacrylate. As the methacrylic acid ester, methyl methacrylate is preferred. These methacrylic acid esters may be used alone or as a mixture of two or more thereof.

A content of the methacrylic acid ester unit contained in the methacrylic resin composition is 98.0% by mass or more, preferably 98.4% by mass or more, generally 100.0% by mass or less, more preferably 98.4 to 99.1% by mass, and still more preferably 98.5 to 98.8% by mass, with respect to 100% by mass of all structural units contained in the methacrylic resin composition. Such a content can be determined by analysis using, for example, pyrolysis gas chromatography.

(Optional Structural Unit Included in Methacrylic Resin)

Each of the methacrylic resin (A) and the methacrylic resin (B) may further have a monomer unit other than the methacrylic acid ester unit, and may have, for example, a structural unit derived from an acrylic acid ester (hereinafter, may be referred to as an acrylic acid ester unit).

Examples of the acrylic acid ester can include methyl acrylate, ethyl acrylate, propyl acrylate, n-butyl acrylate, sec-butyl acrylate, tert-butyl acrylate, cyclohexyl acrylate, benzyl acrylate, 2-ethylhexyl acrylate, 2-hydroxyethyl acrylate, and cyclopentadiene acrylate. As the acrylic acid ester, methyl acrylate or ethyl acrylate is preferred, and methyl acrylate is more preferred. These methacrylic acid esters may be used alone or as a mixture of two or more thereof.

A content of the acrylic acid ester unit contained in the methacrylic resin composition is preferably 0 to 1.6% by mass, more preferably 0.9 to 1.6% by mass, and still more preferably 1.2 to 1.5% by mass. Here, a total content of the methacrylic acid ester unit and the acrylic acid ester unit in the methacrylic resin composition is 100% by mass. Such a content can be determined by analysis using, for example, pyrolysis gas chromatography.

When the content of the acrylic acid ester unit is within the above range, the progress of depolymerization of a copolymer to be obtained can be suppressed, and thermal stability during injection molding can be more improved. When the content of the acrylic acid ester unit is 1.6% by mass or less, heat resistance (Vicat softening temperature described below or the like) of a molded article to be obtained, such as a vehicle member, can be more improved.

Here, as the analysis performed using the pyrolysis gas chromatography or the like, an analysis method known in the related art can be adopted.

For example, the content of the acrylic acid ester unit can be determined by pyrolyzing the methacrylic resin composition of the present invention in a pyrolysis furnace at a predetermined temperature (400° C. or higher), analyzing the generated decomposed gas using gas chromatography, determining an area ratio of a peak corresponding to each monomer component used in the production of the methacrylic resin composition, and converting the obtained area ratio into a mass ratio (%).

As for a method of converting the area ratio into the mass ratio (%), for example, for a standard product of a methacrylic resin (that is available as a commercial product and contains monomer components whose types and mass ratios are known), an area ratio of a peak corresponding to each monomer component is determined in advance similarly to the above, a factor with which the area ratio can be converted into the mass ratio (%) of the monomer component is calculated, or a factor is calculated by creating a calibration curve using a plurality of standard products, if necessary, and the area ratio of the monomer component of the methacrylic resin contained in the methacrylic resin composition of the present invention can be converted into the corresponding mass ratio (%) using the factor. In a case where these peaks partially overlap with each other, the ratio can also be calculated by correcting the overlapping area using a method known in the related art.

An example of an optional structural unit which may be included in the methacrylic resin composition can include a structural unit derived from another monomer which can be copolymerized with a methacrylic acid ester and/or an acrylic acid ester (hereinafter, referred to as another monomer unit), in addition to the acrylic acid ester unit. Examples of a monomer for forming another monomer unit can include a monofunctional monomer having one radically-polymerizable double bond and a polyfunctional monomer having two or more radically-polymerizable double bonds, and these monomers may be used alone or as a mixture of two or more thereof.

Examples of the monofunctional monomer can include an unsaturated carboxylic acid such as acrylic acid, methacrylic acid, maleic acid, itaconic acid, maleic anhydride, or itaconic anhydride, or an acid anhydride thereof; a nitrogen-containing monomer such as acrylamide, methacrylamide, acrylonitrile, or methacrylonitrile; and a styrene-based monomer such as styrene or α-methylstyrene.

Examples of the polyfunctional monomer can include an unsaturated carboxylic acid diester of a glycol, such as ethylene glycol dimethacrylate or butanediol dimethacrylate; an alkenyl ester of an unsaturated carboxylic acid, such as allyl acrylate, allyl methacrylate, or allyl cinnamate; an alkenyl ester of a polybasic acid, such as diallyl phthalate, diallyl maleate, triallyl cyanurate, or triallyl isocyanurate; an unsaturated carboxylic acid ester of a polyhydric alcohol such as trimethylolpropane triacrylate; and divinylbenzene.

[1.2. Requirements (2) and (3)]

W1 and W2 in the requirements (2) and (3) and a mass average molecular weight and a number average molecular weight in the requirement (4) described below in detail can be determined using size-exclusion chromatography (SEC) known in the related art, such as gel permeation chromatography (GPC), according to JIS K 7252-1 to 4 (Plastic-Determination Method of Average Molecular Weight and Molecular Weight Distribution of Polymer by Size-Exclusion Chromatography-Part 1 to Part 4).

More specifically, first, a calibration curve showing a correlation between an elution time (t) and a logarithm (log M) of a molecular weight (M) is created in advance using a commercially available standard substance of a methacrylic resin having a monodisperse molecular weight (a standard substance whose molecular weights such as a number average molecular weight and a mass average molecular weight are known and whose molecular weight distribution is narrow).

Next, a sample containing a methacrylic resin composition to be measured is dissolved in an appropriate solvent to prepare a dilute solution. The solution is injected into a mobile phase (an eluent) and introduced into an SEC column. The SEC column is filled with non-absorbent fine particles having fine pores with a uniform size or various sizes. The sample can be separated from each other by a difference in molecular weight (hydrodynamic volume) as the sample passes through the SEC column. In the SEC column, since a methacrylic resin having a high molecular weight cannot permeate into the fine pores, its elution is fast. On the other hand, since a methacrylic resin having a low molecular weight can permeate into the fine pores, its elution is slow. Then, a concentration of the methacrylic resin in the eluent is continuously detected with a concentration detector to obtain a SEC chromatogram.

Here, the molecular weight (M) of the methacrylic resin corresponding to an arbitrary elution time (t) in the SEC chromatogram is determined using the calibration curve created in advance using a standard substance having a monodisperse molecular weight.

A "differential molecular weight distribution curve" is created by plotting dW/d (log M) against the molecular weight (M) of the methacrylic resin based on the data obtained in the above. "W" refers to a concentration fraction.

More specifically, the differential molecular weight distribution curve can be created by plotting $dW_i/d(\log M_i)$ against a molecular weight $(M_i)$ of the methacrylic resin, $dW_i/d(\log M_i)$ being calculated according to the following equations using the molecular weight $(M_i)$ of the methacrylic resin and a signal intensity $(H_i)$ of the methacrylic resin at each elution time $(t_i)$.

[Math. 1]
$$\Delta W_i = \frac{H_i}{\sum_{i=1}^{n} H_i}$$

$$w_i = \Delta W_i \times \frac{1}{I}$$

$$\frac{dW_i}{d(\log M_i)} = -w_i \times \frac{dt_i}{d(\log M_i)}$$

In the equation, I represents a data collection interval (min).

Figure 1:
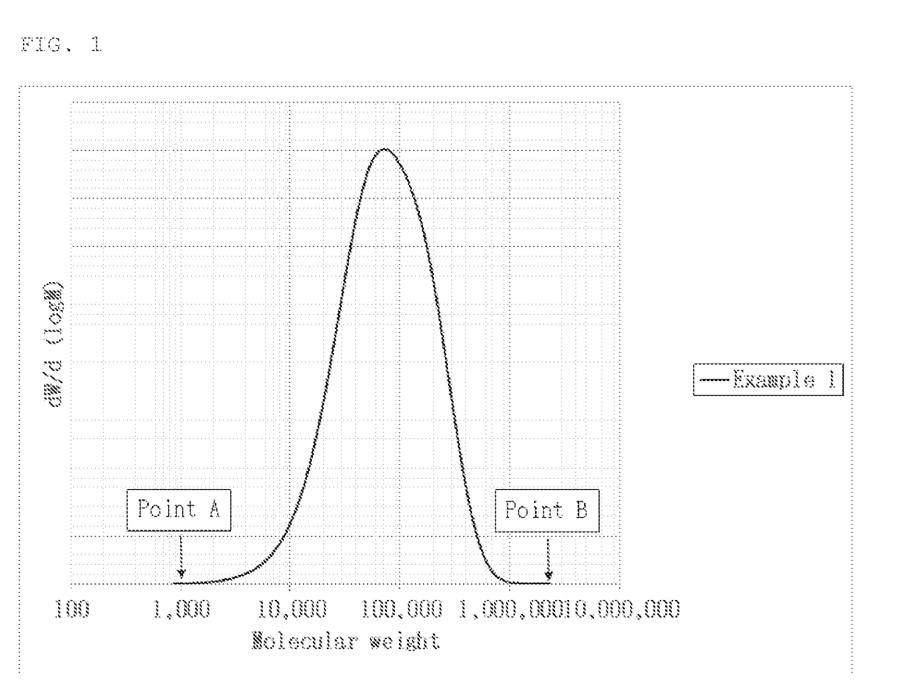
FIG. 1 is a graph showing a differential molecular weight distribution curve of a methacrylic resin composition of Example 1.

As an example of the differential molecular weight distribution curve created in the above, a differential molecular weight distribution curve of a methacrylic resin composition of Example 1 illustrated in FIG. 1 is referred to. As illustrated in FIG. 1, when, among points where the differential molecular weight distribution curve and a straight line of dW/d(log M)=0 intersect, a point on a low molecular weight side is a point A (starting point) and a point of a high molecular weight side is a point B (end point), in a case where an area surrounded by the curve from the starting point to the end point and the straight line (in the present specification, referred to as a peak area) is 100, a ratio (%) of the peak area from the starting point to a molecular weight of 30,000 to the peak area of the starting point to the end point is W1, and a ratio (%) of the peak area from a molecular weight of 300,000 to the end point to the peak area from the starting point to the end point is W2.

As specified in the requirement (2), a value of W1 is 10 to 25, preferably 14 to 22, and more preferably 17 to 19. When the value of W1 is higher than 25, a Charpy impact strength may be decreased. When the value of W1 is lower than 10, fluidity may be decreased.

The value of W1 is preferably 14 or higher, and more preferably 17 or higher, from the viewpoint of setting a spiral flow length to a preferred value.

As specified in the requirement (3), a value of W2 is 3 to 15, preferably 5 to 10, and more preferably 6 to 9. When the value of W2 is higher than 15, fluidity may be decreased. When the value of W2 is lower than 3, solvent resistance may be decreased.

The value of W2 is preferably 5 or higher, and more preferably 6 or higher, from the viewpoint of setting a craze formation time to an allowable time or shorter. The value of W2 is preferably 10 or lower, and more preferably 9 or lower, from the viewpoint of setting a spiral flow length to a preferred value.

[1.3. Requirement (4)]

As specified in the requirement (4), a ratio (Mw/Mn) of the mass average molecular weight of the methacrylic resin composition of the present invention to the number average molecular weight of the methacrylic resin composition of the present invention is 2.0 to 3.2, preferably 2.4 to 3.2, and more preferably 2.5 to 2.6.

The ratio (Mw/Mn) is preferably 2.4 to 3.2, and more preferably 2.5 to 2.6, from the viewpoint of setting a spiral flow length to a preferred value.

[1.4. Mass Average Molecular Weight of Methacrylic Resin]

It is preferable that mass average molecular weights of the methacrylic resin (A) and the methacrylic resin (B) contained in the methacrylic resin composition of the present invention are different from each other, from the viewpoint of solvent resistance, a Charpy impact strength, and fluidity. It is more preferable that the mass average molecular weight of the methacrylic resin (A) is 120,000 or more and 180,000 or less and the mass average molecular weight of the methacrylic resin (B) is 10,000 or more and 60,000 or less.

The mass average molecular weight of the methacrylic resin (A) is preferably 120,000 or more and 180,000 or less, and more preferably 130,000 or more and 160,000 or less. The mass average molecular weight of the methacrylic resin (B) is preferably 10,000 or more and 60,000 or less, and more preferably 30,000 or more and 50,000 or less. The methacrylic resin composition of the present invention may contain two or more methacrylic resins (A), and may contain two or more methacrylic resins (B).

When the mass average molecular weights of the methacrylic resin (A) and the methacrylic resin (B) are within the above ranges, a molded article further excellent in a Charpy impact strength can be obtained from the methacrylic resin composition.

A measurement method of the mass average molecular weight is the same as the above method (method using SEC) described in the calculation method of W1 and W2 in the methacrylic resin composition.

[1.5. Content Ratios of Methacrylic Resin (A) and Methacrylic Resin (B)]

A content of one of the methacrylic resin (A) and the methacrylic resin (B) contained in the methacrylic resin composition and a content of the other of the methacrylic resin (A) and the methacrylic resin (B) are 25% by mass to 35% by mass and 65% by mass to 75% by mass, respectively, with respect to a total content of 100% by mass of the methacrylic resin (A) and the methacrylic resin (B).

When the contents of the methacrylic resin (A) and the methacrylic resin (B) are within the above ranges, a molded article further excellent in a Charpy impact strength can be obtained from the methacrylic resin composition.

[1.6. Use of Methacrylic Resin Composition]

The methacrylic resin composition of the present invention satisfies all the requirements (1) to (4), such that a molded article excellent in a Charpy impact strength can be obtained. Therefore, various molded articles are preferably used as a vehicle member such as a tail lamp cover, a head lamp cover, a visor, or a cover of a meter panel, an optical member such as a lens, a display protective plate, an optical film, or a light guide plate, and a member for a cosmetic container. Among them, the molded article can be particularly preferably used as a molding material for a vehicle member.

[2. Molded Article]

A molded article containing the methacrylic resin composition can be obtained by using the methacrylic resin composition of the present invention.

The molded article containing the methacrylic resin composition of the present invention can be produced by a method such as an extrusion molding method or an injection molding method. Since the methacrylic resin composition of the present invention is excellent in fluidity, the molded article is preferably produced by an injection molding method.

[3. Method of Producing Methacrylic Resin Composition]

The methacrylic resin composition of the present invention can be produced by a production method known in the related art, and can be produced by polymerizing the methacrylic acid ester or a monomer component such as another monomer.

Examples of a method of producing a methacrylic resin by polymerizing the methacrylic acid ester or a monomer component such as another monomer can include known polymerization methods such as a suspension polymerization method, a solution polymerization method, and a bulk polymerization method, and a bulk polymerization method is preferred.

In the case of the bulk polymerization method, since a polymerization stabilizer is not used, a methacrylic resin excellent in an appearance can be obtained. In addition, unlike the suspension polymerization, a polymerization temperature is higher than 100° C., and as a result, syndiotacticity of the methacrylic resin is likely to be decreased, such that fluidity of the methacrylic resin is further increased. Furthermore, in a case where the bulk polymerization is continuously performed, for example, a partial polymer can be continuously extracted, the partial polymer being obtained by continuously feeding the monomer component, and if necessary, a polymerization initiator, a chain transfer agent, and the like, to a reaction vessel, and allowing them to retain in the reaction vessel for a predetermined time. As a result, a methacrylic resin can be obtained with high productivity.

In the production of the methacrylic resin contained in the methacrylic resin composition of the present invention, a polymerization temperature is preferably 110° C. to 190° C.

In the method of producing the methacrylic resin, particularly in the bulk polymerization, an additive such as a polymerization initiator or a chain transfer agent may also be used. As the polymerization initiator, for example, a radical initiator can be used.

Examples of the radical initiator can include an azo compound such as azobisisobutyronitrile, azobisdimethylvaleronitrile, azobiscyclohexanenitrile, 1,1'-azobis(1-acetoxy-1-phenylethane), dimethyl 2,2'-azobisisobutyrate, or 4,4'-azobis-4-cyanovaleric acid; and an organic peroxide such as benzoyl peroxide, lauroyl peroxide, acetyl peroxide, caprylyl peroxide, 2,4-dichlorobenzoyl peroxide, isobutyl peroxide, acetylcyclohexylsulfonyl peroxide, t-butyl peroxypivalate, t-butyl peroxyneodecanoate, t-butyl peroxyneoheptanoate, t-butyl peroxy-2-ethylhexanoate, 1,1-di(t-butylperoxy)cyclohexane, 1,1-di(t-butylperoxy)-3,3,5-trimethylcyclohexane, 1,1-di(t-hexylperoxy)-3,3,5-trimethylcyclohexane, diisopropyl peroxydicarbonate, diisobutyl peroxydicarbonate, di-sec-butyl peroxydicarbonate, di-n-butyl peroxydicarbonate, bis(2-ethylhexyl)peroxydicarbonate, bis(4-t-butylcyclohexyl)peroxydicarbonate, t-amyl peroxy-2-ethylhexanoate, 1,1,3,3-tetramethylbutyl peroxy-ethylhexanoate, 1,1,2-trimethylpropyl peroxy-2-ethylhexanoate, t-butyl peroxyisopropylmonocarbonate, t-amyl peroxyisopropylmonocarbonate, t-butyl peroxy-2-ethylhexylcarbonate, t-butyl peroxyallylcarbonate, t-butyl peroxyisopropylcarbonate, 1,1,3,3-tetramethylbutyl peroxyisopropylmonocarbonate, 1,1,2-trimethylpropyl peroxyisopropylmonocarbonate, 1,1,3,3-tetramethylbutyl peroxyisononanate, 1,1,2-trimethylpropyl peroxyisononanate, or t-butyl peroxybenzoate.

These polymerization initiators may be used alone or as a mixture of two or more thereof.

A type of the polymerization initiator can be selected depending on a type of a methacrylic resin to be produced or a raw material monomer to be used. It is preferable that a half-life period of the radical initiator is within 1 minute at the polymerization temperature.

The chain transfer agent that can be used in the present invention may be either a monofunctional chain transfer agent or a polyfunctional chain transfer agent. Specific examples of the chain transfer agent can include alkyl mercaptans such as n-propyl mercaptan, isopropyl mercaptan, n-butyl mercaptan, t-butyl mercaptan, n-hexyl mercaptan, n-octyl mercaptan, 2-ethylhexyl mercaptan, n-dodecyl mercaptan, and t-dodecyl mercaptan, aromatic mercaptans such as phenyl mercaptan and thiocresol, mercaptans having 18 or fewer carbon atoms, such as ethylene thioglycol, polyhydric alcohols such as ethylene glycol, neopentyl glycol, trimethylolpropane, pentaerythritol, dipentaerythritol, tripentaerythritol, and sorbitol, a compound whose hydroxyl group is esterified with thioglycolic acid or 3-mercaptopropionic acid, 1,4-dihydronaphthalene, 1,4,5,8-tetrahydronaphthalene, β-terpinene, terpinolene, 1,4-cyclohexadiene, and hydrogen sulfide. These chain transfer agents may be used alone or in combination of two or more thereof.

A type and use amount of the chain transfer agent can be selected depending on a type of a methacrylic resin to be produced or a raw material monomer to be used. As the chain transfer agent, n-octyl mercaptan or n-dodecyl mercaptan is preferred.

In addition to the raw material monomer, the polymerization initiator, and the chain transfer agent, for example, a release agent, a rubber-like polymer such as butadiene or styrene-butadiene rubber (SBR), a thermal stabilizer, an ultraviolet absorber, or the like may also be used.

Here, the release agent is used for improving moldability of a methacrylic resin composition to be obtained. The thermal stabilizer is used for suppressing pyrolysis of a methacrylic resin composition to be produced. The ultraviolet absorber is used for suppressing deterioration of a methacrylic resin composition to be produced due to ultraviolet rays.

The release agent is not particularly limited, and examples thereof can include a higher fatty acid ester, a higher fatty acid alcohol, a higher fatty acid, a higher fatty acid amide, and a higher fatty acid metal salt. These release agents may be used alone or in combination of two or more thereof.

A use amount of the release agent is preferably adjusted so as to be 0.01 to 1.0 part by mass and is more preferably adjusted so as to be 0.01 to 0.50 parts by mass, with respect to 100 parts by mass of the methacrylic resin. In a case where the methacrylic resin composition of the present invention contains two or more methacrylic resins, in the present specification, "100 parts by mass of the methacrylic resin" means that a total amount of a plurality of methacrylic resins is 100 parts by mass.

The thermal stabilizer is not particularly limited, and examples thereof can include a hindered phenol-based thermal stabilizer, a phosphorus-based thermal stabilizer, and an organic disulfide compound. Among them, an organic disulfide compound is preferred. These thermal stabilizers may be used alone or in combination of two or more thereof.

A use amount of the thermal stabilizer is preferably 1 to 2,000 mass ppm with respect to 100 parts by mass of the methacrylic resin. When the methacrylic resin composition (more specifically, the methacrylic resin composition after devolatization) is molded to obtain a molded article formed of the methacrylic resin composition of the present invention, a molding temperature may be set to be higher to improve molding efficiency. In this case, when the thermal stabilizer is blended, the effect is more enhanced.

Examples of a type of the ultraviolet absorber can include a benzophenone-based ultraviolet absorber, a cyanoacrylate-based ultraviolet absorber, a benzotriazole-based ultraviolet absorber, a malonic acid ester-based ultraviolet absorber, and an oxalanilide-based ultraviolet absorber. These ultraviolet absorbers may be used alone or in combination of two or more thereof. Among them, a benzotriazole-based ultraviolet absorber, a malonic acid ester-based ultraviolet absorber, or an oxalanilide-based ultraviolet absorber is preferred.

A use amount of the ultraviolet absorber is preferably 5 to 1,000 mass ppm with respect to 100 parts by mass of the methacrylic resin contained in a methacrylic resin composition to be obtained.

An example of the method of producing the methacrylic resin composition of the present invention can include a method of kneading the methacrylic resin and, if necessary, an optional appropriate another component (the release agent, the rubber-like polymer, the thermal stabilizer, and the ultraviolet absorber described above).

An example of the method of producing the methacrylic resin composition can include a method in which a monomer component capable of forming one methacrylic resin of two methacrylic resins is polymerized in the presence of a composition (syrup) containing the other of the two methacrylic resins using a multi-stage polymerization method, and then the syrup is kneaded in an extruder.

Figure 2:
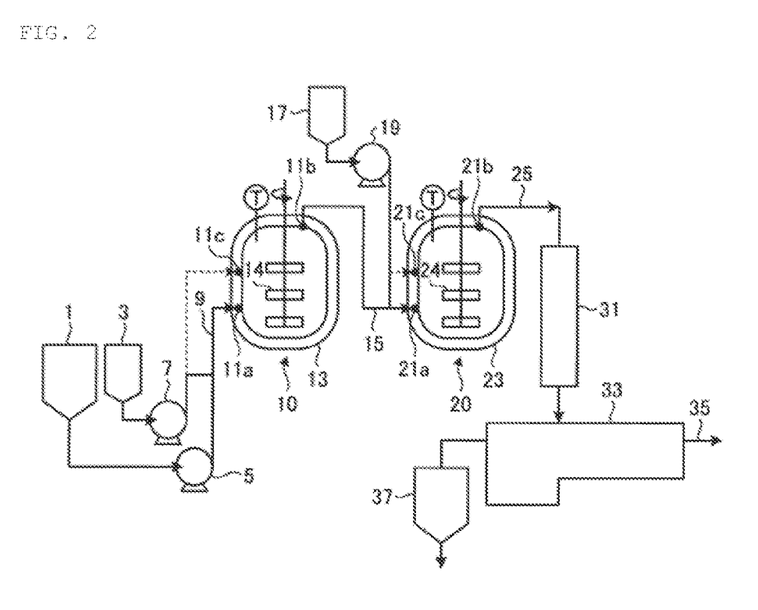
FIG. 2 illustrates an example of an apparatus for producing a methacrylic resin composition according to an embodiment of the present invention.

An example of the multi-stage polymerization method can include a method described in WO 2014-088082 A. FIG. 2 illustrates an example of an apparatus for producing a methacrylic resin composition according to an embodiment of the present invention.

The apparatus includes a raw material monomer tank 1, a polymerization initiator tank 3, a pump 5, a pump 7, a raw material feed pump 9, a first reaction tank 10, a feed port 11a, an extraction port 11b, a feed port 11c, a jacket 13, a stirrer 14, a connection line 15, a polymerization initiator tank 17, a pump 19, a second reaction tank 20, a feed port 21a, an extraction port 21b, a feed port 21c, a jacket 23, a stirrer 24, an extraction line 25, a pre-heater 31, a devolatilization extruder 33, a discharge line 35, and a recovery tank 37.

As illustrated in FIG. 2, the multi-stage polymerization method can be performed using two reaction tanks, and continuous bulk polymerization can be preferably performed in each reaction tank. For example, one of two methacrylic resins can be produced in the first reaction tank 10, and the other of the two methacrylic resins can be produced in the second reaction tank 20 in the presence of the one methacrylic resin. Each of the first reaction tank 10 and the second reaction tank 20 is a complete mixing reaction tank.

A temperature in the first reaction tank 10 is preferably 110° C. to 160° C., more preferably 110° C. to 150° C., and still more preferably 120° C. to 140° C. When the temperature in the first reaction tank 10 is within the above range, a concentration of a chain transfer agent in the first reaction tank 10 is preferably 0.12 to 0.19% by mass with respect to a total mass of a raw material monomer fed to the first reaction tank 10.

A temperature in the second reaction tank 20 is preferably 170° C. to 190° C., and more preferably 175° C. to 185° C. When the temperature in the second reaction tank 20 is within the above range, a concentration of a chain transfer agent fed to the second reaction tank 20 is preferably 0.10 to 0.25% by mass with respect to a total mass of a raw material monomer fed to the second reaction tank 20.

The method of producing the methacrylic resin composition according to an embodiment of the present invention includes a first polymerization step and a second polymerization step.

In the first polymerization step, a raw material composition (A) containing a raw material monomer (A) containing 98.0% by mass or more of a methacrylic acid ester, a polymerization initiator (A), and a chain transfer agent (A) is fed to the first complete mixing reaction tank, the raw material composition (A) is subjected to continuous bulk polymerization in the first complete mixing reaction tank to obtain an intermediate composition (A), and the obtained intermediate composition (A) is extracted from the first complete mixing reaction tank.

In the second polymerization step, a raw material composition (B) containing a raw material monomer (B) containing 98.0% by mass or more of a methacrylic acid ester, a polymerization initiator (B), and a chain transfer agent (B), and the intermediate composition (A) extracted in the first polymerization step are fed to the second complete mixing reaction tank, the raw material composition (B) and the intermediate composition (A) are further subjected to continuous bulk polymerization in the second complete mixing reaction tank to obtain a methacrylic resin composition, and the obtained methacrylic resin composition is extracted from the second complete mixing reaction tank.

Examples and preferred examples of the methacrylic acid ester contained in the raw material monomer (A) or the raw material monomer (B) can include examples and preferred examples of the methacrylic acid ester exemplified in the description of the methacrylic resin (A) or the methacrylic resin (B).

As the polymerization initiator (A) and the polymerization initiator (B), the polymerization initiator exemplified above can be used. As the chain transfer agent (A) and the chain transfer agent (B), the chain transfer agent exemplified above can be used.

In an embodiment, the method of producing the methacrylic resin composition preferably satisfies the following requirements (11) and (12):

$$1.5 \leq L^A/L^B \leq 1.9; \text{ and} \qquad (11)$$

$$0.5 \leq S^B/S^A \leq 2.5, \qquad (12)$$

Here, $L^A$ represents a concentration (% by mass) of the polymerization initiator (A) in the raw material composition (A).

$L^B$ represents a concentration (% by mass) of the polymerization initiator (B) in a mixture of the raw material composition (B) and the intermediate composition (A).

$S^A$ represents a concentration (% by mass) of the chain transfer agent (A) in the raw material composition (A).

$S^B$ represents a concentration (% by mass) of the chain transfer agent (B) in the mixture of the raw material composition (B) and the intermediate composition (A).

The production method of the present embodiment satisfies the requirements (11) and (12), such that a methacrylic resin composition capable of obtaining a molded article excellent in a Charpy impact strength can be produced.

A value of $L^A/L^B$ is more preferably 1.6 or more, and still more preferably 1.7 or more, but more preferably 1.8 or less, and still more preferably 1.75 or less, from the viewpoint of stability when drawing a strand discharged from the extruder into a pelletizer to mold the strand into pellets. When the value of $L^A/L^B$ is high, a ratio of a high molecular weight component produced in the first tank is high, and a load on the extruder thus increases. In addition, when the value of $L^A/L^B$ is low, a ratio of a low molecular weight component produced in the second tank is high. A mechanical strength of the strand is thus low when the strand discharged from the extruder is drawn into the pelletizer to mold the strand into pellets. As a result, the strand may be broken, or the amount of fine powder may be increased.

A value of $S^B/S^A$ is more preferably 0.6 or more, and still more preferably 1.0 or more, but more preferably 2.0 or less, and still more preferably 1.5 or less.

It is more preferable that the production method of the present embodiment satisfies the following requirements (13) and (14):

$$25 \geq \theta^1 \geq 45; \text{ and} \qquad (13)$$

$$10 \leq \theta^2 \leq 25, \qquad (14)$$

Here, $\theta^1$ represents a retention time (min) in the first complete mixing reaction tank in the first polymerization step.

$\theta^2$ represents a retention time (min) in the second complete mixing reaction tank in the second polymerization step.

The production method of the present embodiment satisfies the requirements (13) and (14), such that a methacrylic resin composition capable of obtaining a molded article excellent in a Charpy impact strength can be produced.

$\theta^1$ is more preferably 30 or more, and still more preferably 35 or more, from the viewpoint of production efficiency, but more preferably 40 or less, and still more preferably 38 or less, from the viewpoint of production stability.

The shorter the retention time, the better the production stability, but when the retention time is too short, the friction in a connection pipe between the first reaction tank and the second reaction tank becomes large, which may cause difficulty in feeding a liquid to the pump.

$\theta^2$ is more preferably 15 or more, and still more preferably 20 or more, from the viewpoint of production efficiency, but more preferably 23 or less, from the viewpoint of production stability. The shorter the retention time, the better the production stability, but when the retention time is too short, the friction in a connection pipe between the first reaction tank and the second reaction tank becomes large, which may cause difficulty in feeding a liquid to the pump.

The method of producing the methacrylic resin composition of the present embodiment may include an optional step, in addition to the first polymerization step and the second polymerization step. Examples of the optional step can include a step of removing a volatile component such as an unreacted raw material monomer from the methacrylic resin composition obtained in the second polymerization step, and a step of molding a methacrylic resin composition into a form such as pellets.

EXAMPLES

Hereinafter, although the present invention will be described in more detail with reference to Examples and Comparative Examples, the present invention is not limited to these Examples.

Hereinafter, evaluation methods of "a content of a structural unit derived from a methacrylic acid ester in a methacrylic resin composition", "W1, W2, and Mw/Mn", "a spiral flow length", "a craze formation time", "a Charpy impact strength", and "a Vicat softening temperature" will be described.

<Content of Methacrylic Acid Ester Structural Unit with Respect to Total Content of all Structural Units in Methacrylic Resin Composition>

A content of a methacrylic acid ester structural unit with respect to a total content of all structural units in a methacrylic resin composition was determined by analyzing pellets of the methacrylic resin composition using pyrolysis gas chromatography and measuring a peak area corresponding to each of a methacrylic acid ester and an acrylic acid ester which were used as monomer components. Measurement conditions of the pyrolysis gas chromatography are as follows.

(Pyrolysis Conditions)
Sample preparation: The methacrylic resin composition was precisely weighed (2 to 3 mg as a standard) and was put in the central portion of a metal cell formed into a gutter shape, and the metal cell was folded to enclose the methacrylic resin composition by lightly pressing both ends of the metal cell with a plier.
Pyrolysis apparatus: CURIE POINT PYROLYZER JHP-22 (manufactured by Japan Analytical Industry Co., Ltd.)
Metal cell: Pyrofoil F590 (manufactured by Japan Analytical Industry Co., Ltd.)
Set temperature of constant temperature tank: 200° C.
Set temperature of heat retention pipe: 250° C.
Pyrolysis temperature: 590° C.
Pyrolysis time: 5 sec (Gas Chromatography Analysis Conditions)
Gas chromatography analyzer: GC-14B (manufactured by Shimadzu Corporation)
Detection method: FID
Column: 7G 3.2 m×3.1 mmφ (manufactured by Shimadzu Corporation)
Filler: FAL-M (manufactured by Shimadzu Corporation, packed column)
Carrier gas: Air/$N_2$/$H_2$=50/100/50 (kPa), 80 ml/min
Condition for increasing temperature of column: Maintaining temperature at 100° C. for 15 minutes, increasing temperature to 150° C. at a rate of 10° C./min, and then maintaining temperature at 150° C. for 14 minutes
Injection temperature: 200° C.
Detection temperature: 200° C.

A peak area (a1) corresponding to the methacrylic acid ester and a peak area (b1) corresponding to the acrylic acid ester, which were detected under the above pyrolysis conditions and chromatography analysis conditions, were determined. A peak area ratio A (=b1/a1) was determined using these peak areas.

Next, a standard product of a methacrylic resin in which a mass ratio of an acrylic acid ester structural unit to a methacrylic acid ester structural unit was W0 (known) (a mass of the acrylic acid ester structural unit/a mass of the methacrylic acid ester structural unit) was analyzed under the above pyrolysis conditions and chromatography analysis conditions to determine a peak area (a0) corresponding to the detected methacrylic acid ester and a peak area (b0) corresponding to the detected acrylic acid ester. A peak area ratio A0 (=b0/a0) was determined using these peak areas.

A factor f (=W0/A0) was determined using the peak area ratio A0 and the mass ratio W0.

Next, a mass ratio W of the acrylic acid ester structural unit to the methacrylic acid ester structural unit (the mass of the acrylic acid ester structural unit/the mass of the methacrylic acid ester structural unit) was determined by multiplying the peak area ratio A by the factor f, the acrylic acid ester structural unit and the methacrylic acid ester structural unit being included in the methacrylic resin composition to be measured. Each of a content (% by mass) of the methacrylic acid ester structural unit and a content (% by mass) of the acrylic acid ester structural unit with respect to a total content of the methacrylic acid ester structural unit and the acrylic acid ester structural unit was calculated using the mass ratio W. In the following Examples and Comparative Examples, the content (% by mass) of the methacrylic acid ester structural unit with respect to the total content of the all structural units in the methacrylic resin composition was determined.

<Evaluation Methods of W1, W2, and Mw/Mn>
(GPC Measurement)
Pellets of the methacrylic resin composition were analyzed with GPC measurement to determine W1, W2, and Mw/Mn. The GPC measurement conditions are as follows.
(GPC Analysis Conditions)
Measuring apparatus: HLC-8320GPC, manufactured by Tosoh Corporation
Column configuration:
Sample column: connecting two columns of TSKgel Super Multipore HZ-M and one column of TSKguard Column Super MP(HZ)-M in series
Reference column: connecting two columns of TSKgel Super H-RC in series
Detector: reflective index (RI) (differential refractive) detector
Calculation method: molecular weight calculation Internal standard: Chloroform was used as an internal standard.
Allowable time at internal standard peak: 0.15 min
Elution time at internal standard peak: An elution time of chloroform at the time of measuring a standard sample for a calibration curve was set.
Reference sample: THF (special grade, manufactured by FUJIFILM Wako Pure Chemical Corporation)
Measurement sample: 25 mg of a methacrylic resin composition was sufficiently dissolved in 5 cc of a THF/chloroform solution in which chloroform (manufactured by FUJIFILM Wako Pure Chemical Corporation) as an internal standard was dissolved in THF (special grade, manufactured by FUJIFILM Wako Pure Chemical Corporation) to 0.04 vol %, thereby preparing a measurement sample.
Column temperature: 40° C.
Injection amount: 10 μL
Pump flow rate of sample: 0.35 ml/min
Pump flow rate of reference: 0.60 ml/min An RI detection intensity with respect to the elution time of the methacrylic resin composition was measured under the GPC analysis conditions. As a standard sample for a calibration curve, the following seven methacrylic resins (Shodex STANDARD M-75, manufactured by Showa Denko K. K.) whose monodisperse mass average molecular weights were known and different from each other were used.

Peak Molecular Weights
Standard sample 1: 1,050,000
Standard sample 2: 569,000
Standard sample 3: 211,000
Standard sample 4: 68,800
Standard sample 5: 18,500
Standard sample 6: 7,360
Standard sample 7: 3,070

The standard sample for a calibration curve was measured under the same conditions as those of the methacrylic resin composition to determine an elution time at a peak top of each standard sample. The following cubic approximate expression was calculated from the obtained results of the elution time and the peak molecular weight and used as a calibration formula when analyzing the measurement results of the methacrylic resin composition.

Log M (molecular weight)=$At^3+Bt^2+Ct+D$

A, B, C, and D: variables
t: elution time (Determination Methods of W1, W2, and Mw/Mn)

Mw/Mn was obtained by analyzing the methacrylic resin composition with the above GPC measurement. The obtained GPC curve was output at an interval of 500 m/sec of the elution time to create a differential molecular weight distribution curve. FIG. 1 is a graph showing a differential molecular weight distribution curve of a methacrylic resin composition of Example 1. When, among points where the differential molecular weight distribution curve and a straight line of dW/d(log M)=0 intersect, a point on a low molecular weight side was a point A (starting point) and a point of a high molecular weight side was a point B (end point), in a case where an area surrounded by the curve and the straight line was 100, the calculation was performed by setting a ratio (%) of an area from the starting point to a molecular weight of 30,000 to W1 and a ratio (%) of an area from a molecular weight of 300,000 to the end point to W2.

<Evaluation Method of Spiral Flow Length>

A methacrylic resin composition was primarily dried in an oven under 80° C. atmosphere for 12 hours or longer, and the dried methacrylic resin composition was ejected from the central portion of a circular spiral mold using an injection molding machine (Si-180V CH450C, manufactured by Toyo Machinery & Metal Co., Ltd., equipped with a hopper and heaters 1 to 5), thereby obtaining an injection molded article. In this case, a reach distance (mm) of the methacrylic resin composition in the mold was measured (hereinafter, referred to as a "spiral flow length (mm)". The reach distance was determined by reading a scale transferred from the mold to the injection molded article. The longer the reach distance, the better the fluidity of the methacrylic resin composition. The injection conditions and the circular mold used for evaluation are as follows.

Molding Temperature Setting:
heater 1: 260° C., heater 2: 260° C., heater 3: 260° C., heater 4: 240° C., heater 5: 220° C., hopper: 60° C.
Mold temperature: 60° C.
Injection rate: 100 mm/sec
Holding pressure: 50 MPa
Holding pressure switching position: 5 mm
Holding pressure time: 5 sec
Holding pressure rate: 50 mm/s
Cooling time: 30 sec
Screw rotation speed during weighing: 60 rpm
Back pressure: 10 MPa
A weighing position of the screw was adjusted so that a maximum injection pressure was 150 MPa, and a flow length of the resin at this time was read.
Circular spiral mold: A circular spiral mold having a thickness of 2 mm and a width of 10 mm was used.

<Evaluation Method of Craze Formation Time>

A methacrylic resin composition was primarily dried in an oven under 80° C. atmosphere for 12 hours or longer, and the dried methacrylic resin composition was subjected to injection molding using an injection molding machine (EC130SXII-4A, manufactured by SHIBAURA MACHINE CO., LTD., equipped with a hopper and heaters HN, H1, H2, and H3), thereby obtaining a flat plate having a length of 174 mm, a width of 25.4 mm, and a thickness of 3 mm. The injection conditions are as follows.

Molding Temperature Setting:
HN: 255° C., H1: 260° C., H2: 260° C., H3: 240° C., under hopper: 50° C.
Mold temperature: 60° C.
Injection rate: 60 mm/sec
Holding pressure: 60 MPa
Holding pressure switching position: 5 mm
Holding pressure rate: 20 mm/sec
Cooling time: 40 sec
Injection time: 10 sec
Screw rotation speed during weighing: 50 rpm
Back pressure: 10 MPa
Screw weighing value: 30 mm
Maximum injection pressure: 70 MPa One 6 mm hole was made at a position corresponding to 10 mm from an edge of a gate in an injection direction of the obtained flat plate and at the central position in a direction perpendicular to the injection direction (width direction), and then, annealing and drying were performed at 80° C. for 7 hours using a hot air circulation oven. The flat plate immediately after the drying was stored in a desiccator containing a desiccant for 16 hours, thereby obtaining a test piece.

A solvent resistance test was performed using the obtained test piece. The test was performed in a constant-temperature and constant-humidity chamber of 23° C./50%

RH. A cantilever method was adopted as a test method, and the test was performed by the following procedures (a) to (c).

(a) A surface of the test piece within a range of 100 mm to 130 mm from an edge of the gate of the test piece was sandwiched by a fixing base to be supported to maintain the surface of the test piece to be substantially horizontal, and ethanol ("first class grade reagent ethanol", manufactured by Wako Pure Chemical Industries, Ltd.) was applied to an upper surface of the test piece within a range of 90 mm to 100 mm from the edge of the gate into a strip shape. Note that ethanol is regularly applied to avoid volatilization of the ethanol.

(b) A load of 800 g was applied to the hole provided at a position corresponding to 10 mm from the edge of the gate to generate a predetermined surface stress on the test piece.

(c) A time (sec) from the start of the application of ethanol to formation of a craze on the test piece was measured. A "craze formation time" (sec) at a certain surface stress was measured by using the method to evaluate solvent resistance of the test piece. The longer the craze formation time, the better the solvent resistance.

<Evaluation Method of Charpy Impact Strength>

A methacrylic resin composition was subjected to injection molding using an injection molding machine (EC130SXII-4A, manufactured by SHIBAURA MACHINE CO., LTD.), thereby obtaining a flat plate having a length of 120 mm, a width of 100 mm, and a thickness of 3 mm. The injection conditions are as follows.

Molding Temperature Setting:
HN: 255° C., H1: 260° C., H2: 240° C., H3: 230° C., under hopper: 60° C.
Mold temperature: 60° C.
Injection rate: 60 mm/sec
Holding pressure: 60 MPa
Holding pressure switching position: 9 mm
Holding pressure rate: 20 mm/sec
Cooling time: 30 sec
Injection time: 10 sec
Screw rotation speed during weighing: 50 rpm
Back pressure: 10 MPa
Screw weighing value: 44 mm
Maximum injection pressure: 200 MPa A plurality of test pieces were cut out from the obtained flat plate, and a cut surface was subjected to mirror polishing to obtain a test piece having a length of 80 mm, a width of 10 mm, and a thickness of 3 mm. As the test piece, two test pieces of a test piece MD whose long side was cut out along a flow direction (MD direction) of the resin and a test piece TD whose long side was cut out along a direction vertical to the flow direction (MD direction) of the resin (TD direction) were prepared.

The test was performed 6 times using the test piece MD and the test piece TD under the following conditions, an average value of the test piece MD and an average value of the test piece TD were calculated and used as a Charpy impact strength (MD) and a Charpy impact strength (TD), respectively.

Test apparatus: IMPACT TESTER, manufactured by YASUDA SEIKI SEISAKUSHO, LTD.
Hammer: 1 J
Test direction: edgewise <Measurement Method of Vicat Softening Temperature>

A methacrylic resin composition was subjected to injection molding using a heat distortion tester (148-6 series, manufactured by YASUDA SEIKI SEISAKUSHO, LTD.) in accordance with JIS K7206 (B50 method), and a Vicat softening temperature (° C.) of the obtained test piece was measured.

<Example 1> Production of Methacrylic Resin Composition 1

A methacrylic resin composition was produced using a continuous polymerization apparatus illustrated in FIG. 2. A complete mixing reaction tank having a capacity of 13 L was used as the first reaction tank 10 in FIG. 2, and a complete mixing reaction tank having a capacity of 8 L was used as the second reaction tank 20 in FIG. 2.

(First Polymerization Step)

In the first reaction tank 10, 98.44 parts by mass of methyl methacrylate, 1.40 parts by mass of methyl acrylate, 0.146 parts by mass of a chain transfer agent [n-octyl mercaptan, a chain transfer agent (A)], and 0.0142 parts by mass of a polymerization initiator [t-amyl peroxy-2-ethylhexanoate, a polymerization initiator (A)], as a raw material composition (A), were mixed with each other, thereby obtaining a syrup 1.

A flow rate was adjusted so that a retention time ($\theta^1$) of the syrup 1 in the first reaction tank 10 was 37.3 minutes.

A temperature of the jacket 13 surrounding an outer wall surface of the first reaction tank 10 was adjusted, a temperature (T1) in the first reaction tank 10 was set to 140° C., and continuous bulk polymerization was performed, thereby obtaining the syrup 1 as an intermediate composition (A).

(Second Polymerization Step)

Next, a raw material monomer solution 2 fed to the second reaction tank 20, as a raw material composition (B), was prepared. The raw material monomer solution 2 was a solution prepared by mixing 96.84 parts by mass of methyl methacrylate, 1.4 parts by mass of methyl acrylate, 1.673 parts by mass of a chain transfer agent [n-octyl mercaptan, a chain transfer agent (B)], and 0.0915 parts by mass of a polymerization initiator [1,1-di(t-butylperoxy)cyclohexane, a polymerization initiator (B)] with each other.

In the second reaction tank 20, a flow rate was adjusted so that the raw material monomer solution 2 and the syrup 1 were mixed with each other in a mass ratio of 1:10.2. Therefore, a mixture of the raw material monomer solution 2 as the raw material composition (B) and the syrup 1 as the intermediate composition (A) was obtained. A retention time ($\theta^2$) of the mixture in the second reaction tank 20 was 22.3 minutes.

A temperature of the jacket 23 surrounding an outer wall surface of the second reaction tank 20 was adjusted, a temperature (T2) in the second reaction tank 20 was set to 175° C., and continuous bulk polymerization was performed, thereby obtaining a syrup 2.

The continuous bulk polymerization was performed in a state where the first reaction tank 10 and the second reaction tank 20 were filled with a reaction mixture (mixed solution) and a gas phase was not substantially present (in a state of full solution).

The reaction mixture in the second reaction tank 20 was continuously extracted from the extraction port 21b positioned at a top of the second reaction tank 20 as a methacrylic resin composition. The obtained methacrylic resin composition was passed through the extraction line 25 and was heated to 200° C. with the pre-heater 31, and a volatile component such as an unreacted raw material monomer was removed with the devolatilization extruder 33 with a vent at 250° C. The obtained methacrylic resin composition was extruded in a molten state, cooled with water, cut, and discharged from the discharge line 35 as pellets.

By performing these operations, a methacrylic resin composition 1 was produced in a form of pellets.

<Example 2> Production of Methacrylic Resin Composition 2

A methacrylic resin composition 2 was produced in a form of pellets in the same manner as that of Example 1 except for the following points.

In the first reaction tank 10, 98.46 parts by mass of methyl methacrylate, 1.40 parts by mass of methyl acrylate, 0.125 parts by mass of a chain transfer agent [n-octyl mercaptan], and 0.0142 parts by mass of a polymerization initiator [t-amyl peroxy-2-ethylhexanoate] were mixed with each other, thereby obtaining a syrup 1.

The raw material monomer solution 2 fed to the second reaction tank 20 was prepared. The raw material monomer solution 2 was prepared by mixing 95.72 parts by mass of methyl methacrylate, 1.4 parts by mass of methyl acrylate, 2.789 parts by mass of a chain transfer agent [n-octyl mercaptan], and 0.0915 parts by mass of a polymerization initiator [1,1-di(t-butylperoxy)cyclohexane] with each other.

<Example 3> Production of Methacrylic Resin Composition 3

A methacrylic resin composition 3 was produced in a form of pellets in the same manner as that of Example 1 except for the following points.

In the first reaction tank 10, 98.436 parts by mass of methyl methacrylate, 1.40 parts by mass of methyl acrylate, 0.150 parts by mass of a chain transfer agent [n-octyl mercaptan], and 0.0142 parts by mass of a polymerization initiator [t-amyl peroxy-2-ethylhexanoate] were mixed with each other, thereby obtaining a syrup 1.

<Example 4> Production of Methacrylic Resin Composition 4

A methacrylic resin composition 4 was produced in a form of pellets in the same manner as that of Example 1 except for the following points.

In the first reaction tank 10, 98.436 parts by mass of methyl methacrylate, 1.40 parts by mass of methyl acrylate, 0.150 parts by mass of a chain transfer agent [n-octyl mercaptan], and 0.0142 parts by mass of a polymerization initiator [t-amyl peroxy-2-ethylhexanoate] were mixed with each other, thereby obtaining a syrup 1.

The raw material monomer solution 2 fed to the second reaction tank 20 was prepared. The raw material monomer solution 2 was prepared by mixing 97.39 parts by mass of methyl methacrylate, 1.4 parts by mass of methyl acrylate, 1.116 parts by mass of a chain transfer agent [n-octyl mercaptan], and 0.0915 parts by mass of a polymerization initiator [1,1-di(t-butylperoxy)cyclohexane] with each other.

<Example 5> Production of Methacrylic Resin Composition 5

A methacrylic resin composition 5 was produced in a form of pellets in the same manner as that of Example 1 except for the following points.

In the first reaction tank 10, 98.402 parts by mass of methyl methacrylate, 1.40 parts by mass of methyl acrylate, 0.184 parts by mass of a chain transfer agent [n-octyl mercaptan], and 0.0142 parts by mass of a polymerization initiator [t-amyl peroxy-2-ethylhexanoate] were mixed with each other, thereby obtaining a syrup 1.

The raw material monomer solution 2 fed to the second reaction tank 20 was prepared. The raw material monomer solution 2 was prepared by mixing 96.84 parts by mass of methyl methacrylate, 1.4 parts by mass of methyl acrylate, 1.673 parts by mass of a chain transfer agent [n-octyl mercaptan], and 0.0915 parts by mass of a polymerization initiator [1,1-di(t-butylperoxy)cyclohexane] with each other.

<Comparative Example 1> Production of Methacrylic Resin Composition C1

A methacrylic resin composition C1 was produced in a form of pellets in the same manner as that of Example 1 except for the following points.

In the first reaction tank 10, 99.39 parts by mass of methyl methacrylate, 0.50 parts by mass of methyl acrylate, 0.098 parts by mass of a chain transfer agent [n-octyl mercaptan], and 0.0072 parts by mass of a polymerization initiator [t-amyl peroxy-2-ethylhexanoate] were mixed with each other, thereby obtaining a syrup 1.

A flow rate was adjusted so that a retention time of the syrup 1 in the first reaction tank 10 was 61.6 minutes.

The raw material monomer solution 2 fed to the second reaction tank 20 was prepared. The raw material monomer solution 2 was prepared by mixing 94.05 parts by mass of methyl methacrylate, 0.50 parts by mass of methyl acrylate, 5.35 parts by mass of a chain transfer agent [n-octyl mercaptan], and 0.100 parts by mass of a polymerization initiator [1,1-di(t-butylperoxy)cyclohexane] with each other.

In the second reaction tank 20, a flow rate was adjusted so that the raw material monomer solution 2 and the syrup 1 were mixed with each other in a mass ratio of 1:9.7. A retention time of the mixture in the second reaction tank 20 was 36.6 minutes.

<Comparative Example 2> Production of Methacrylic Resin Composition C2

A methacrylic resin composition C2 was produced in a form of pellets in the same manner as that of Example 1 except for the following points.

In the first reaction tank 10, 98.46 parts by mass of methyl methacrylate, 1.40 parts by mass of methyl acrylate, 0.125 parts by mass of a chain transfer agent [n-octyl mercaptan], and 0.0142 parts by mass of a polymerization initiator [t-amyl peroxy-2-ethylhexanoate] were mixed with each other, thereby obtaining a syrup 1.

The raw material monomer solution 2 fed to the second reaction tank 20 was prepared. The raw material monomer solution 2 was prepared by mixing 94.08 parts by mass of methyl methacrylate, 1.4 parts by mass of methyl acrylate, 4.463 parts by mass of a chain transfer agent [n-octyl mercaptan], and 0.0536 parts by mass of a polymerization initiator [1,1-di(t-butylperoxy)cyclohexane] with each other.

<Synthesis Example 1> Production of Methacrylic Resin Composition C3'

A methacrylic resin composition was produced using a continuous polymerization apparatus illustrated in FIG. 2. A complete mixing reaction tank having a capacity of 13 L was used as the first reaction tank 10 in FIG. 2, and a complete mixing reaction tank having a capacity of 8 L was used as the second reaction tank 20 in FIG. 2.

(Polymerization Step)

In the first reaction tank 10, 91.6 parts by mass of methyl methacrylate, 8.00 parts by mass of methyl acrylate, 0.389 parts by mass of a chain transfer agent [n-octyl mercaptan], and 0.0097 parts by mass of a polymerization initiator [t-amyl peroxy-2-ethylhexanoate], as a raw material composition (A), were mixed with each other, thereby obtaining a syrup 1.

A flow rate was adjusted so that a retention time ($\theta^1$) of the syrup 1 in the first reaction tank 10 was 59.1 minutes.

A temperature of the jacket 13 surrounding an outer wall surface of the first reaction tank 10 was adjusted, a temperature (T1) in the first reaction tank 10 was set to 140° C., and continuous bulk polymerization was performed, thereby obtaining the syrup 1 as an intermediate composition (A).

Only the syrup 1 was fed to the second reaction tank 20 without performing the second polymerization step in which the raw material composition (B) and the intermediate composition (A) were polymerized in the second reaction tank 20. The temperature of the jacket 23 surrounding the outer wall surface of the second reaction tank 20 was adjusted, and the temperature (T2) in the second reaction tank 20 was set to 140° C., thereby obtaining a syrup 2.

The bulk polymerization was performed in a state where the first reaction tank 10 and the second reaction tank 20 were filled with a reaction mixture (mixed solution) and a gas phase was not substantially present (in a state of full solution).

The reaction mixture in the second reaction tank 20 was continuously extracted from the extraction port 21b positioned at the top of the second reaction tank 20 as a methacrylic resin composition. The obtained methacrylic resin composition was passed through the extraction line 25 and was heated to 200° C. with the pre-heater 31, and a volatile component such as an unreacted raw material monomer was removed with the devolatilization extruder 33 with a vent at 250° C. The obtained methacrylic resin composition was extruded in a molten state, cooled with water, cut, and discharged from the discharge line 35 as pellets.

By performing these operations, a methacrylic resin composition C3' was produced in a form of pellets.

<Comparative Example 3> Production of Methacrylic Resin Composition C3

25 parts by mass of the methacrylic resin composition C1 and 75 parts by mass of the methacrylic resin composition C3' were mixed with each other. The obtained mixture was melt-kneaded so that a resin temperature was 250° C. and the melt-kneaded mixture was extruded into a strand shape using a single-screw extruder (screw diameter of 40 mm), and then the extruded mixture was cooled with water and cut out with a strand cutter, thereby producing a methacrylic resin composition C3 into a form of pellets.

<Comparative Example 4> Production of Methacrylic Resin Composition C4

50 parts by mass of the methacrylic resin composition C1 and 50 parts by mass of the methacrylic resin composition C3' were mixed with each other. The obtained mixture was melt-kneaded so that a resin temperature was 250° C. and the melt-kneaded mixture was extruded into a strand shape using a single-screw extruder (screw diameter of 40 mm), and then the extruded mixture was cooled with water and cut out with a strand cutter, thereby producing a methacrylic resin composition C4 into a form of pellets.

The production conditions of Examples and Comparative Examples and evaluation results of the obtained methacrylic resin compositions are shown in the following table. In the following table, the abbreviations represent the following meanings.

$L^A$ (% by mass): concentration of polymerization initiator (A) in raw material composition (A)

$L^B$ (% by mass): concentration of polymerization initiator (B) in mixture of raw material composition (B) and intermediate composition (A)

$S^A$ (% by mass): concentration of chain transfer agent (A) in raw material composition (A)

$S^B$ (% by mass): concentration of chain transfer agent (B) in mixture of raw material composition (B) and intermediate composition (A)

$\theta^1$ (min): retention time in first reaction tank in first polymerization step $\theta^2$ (min): retention time in second reaction tank in second polymerization step

TABLE 1

| | Example 1 (Methacrylic resin composition 1) | Example 2 (Methacrylic resin composition 2) | Example 3 (Methacrylic resin composition 3) | Example 4 (Methacrylic resin composition 4) | Example 5 (Methacrylic resin composition 5) |
|---|---|---|---|---|---|
| $L^A$ (% by mass) | 0.0142 | 0.0142 | 0.0142 | 0.0142 | 0.0142 |
| $L^B$ (% by mass) | 0.0082 | 0.0082 | 0.0082 | 0.0082 | 0.0082 |
| $L^A/L^B$ | 1.73 | 1.73 | 1.73 | 1.73 | 1.73 |
| $S^A$ (% by mass) | 0.146 | 0.125 | 0.150 | 0.150 | 0.184 |
| $S^B$ (% by mass) | 0.15 | 0.25 | 0.15 | 0.100 | 0.150 |
| $S^B/S^A$ | 1.03 | 2.00 | 1.00 | 0.667 | 0.815 |
| $\theta^1$ (min) | 37.3 | 37.3 | 37.3 | 37.3 | 37.3 |
| $\theta^2$ (min) | 22.3 | 22.3 | 22.3 | 22.3 | 22.3 |
| $\theta^1/\theta^2$ | 1.67 | 1.67 | 1.67 | 1.67 | 1.67 |
| Content (% by mass) of methacrylic ester structural unit in methacrylic resin composition | 98.6 | 98.6 | 98.6 | 98.6 | 98.6 |
| W1 (%) | 17.6 | 21.8 | 18.9 | 14.0 | 21.4 |
| W2 (%) | 6.1 | 8.4 | 5.5 | 5.8 | 3.1 |
| Mw/Mn (—) | 2.5 | 3.1 | 2.6 | 2.2 | 2.4 |

TABLE 1-continued

Table 1

|  | Example 1 (Methacrylic resin composition 1) | Example 2 (Methacrylic resin composition 2) | Example 3 (Methacrylic resin composition 3) | Example 4 (Methacrylic resin composition 4) | Example 5 (Methacrylic resin composition 5) |
|---|---|---|---|---|---|
| Spiral flow length (mm) | 460 | 460 | 460 | 430 | 510 |
| Craze formation time (sec) | 24 | 25 | 22 | 24 | 9 |
| Charpy impact strength (MD) (kJ/m$^2$) | 21.2 | 21.6 | 23.3 | 24.2 | 21.2 |
| Charpy impact strength (TD) (kJ/m$^2$) | 14.8 | 15.4 | 17.6 | 16.7 | 16.3 |
| Vicat softening temperature (° C.) | 109 | 109 | 109 | 110 | 110 |

TABLE 2

Table 2

|  | Comparative Example 1 (Methacrylic resin composition C1) | Comparative Example 2 (Methacrylic resin composition C2) | Synthesis Example 1 (Methacrylic resin composition C3') | Comparative Example 3 (Methacrylic resin composition C3) | Comparative Example 4 (Methacrylic resin composition C4) |
|---|---|---|---|---|---|
| $L^A$ (% by mass) | 0.0072 | 0.0142 | 0.0097 | — | — |
| $L^B$ (% by mass) | 0.0093 | 0.0048 | — | — | — |
| $L^A/L^B$ | 0.77 | 2.96 | — | — | — |
| $S^A$ (% by mass) | 0.0980 | 0.125 | 0.389 | — | — |
| $S^B$ (% by mass) | 0.500 | 0.400 | — | — | — |
| $S^B/S^A$ | 5.10 | 3.20 | — | — | — |
| $\theta^1$ (min) | 61.6 | 37.3 | 59.1 | — | — |
| $\theta^2$ (min) | 36.6 | 22.3 | — | — | — |
| $\theta^1/\theta^2$ | 1.68 | 1.67 | — | — | — |
| Content (% by mass) of methacrylic ester structural unit in methacrylic resin composition | 99.5 | 98.6 | 34.1 | 35.2 | 97.1 |
| W1 (%) | 28.5 | 25.0 | 22.1 | 23.6 | 25.0 |
| W2 (%) | 13.4 | 8.5 | 0.16 | 3.4 | 6.6 |
| Mw/Mn (−) | 5.1 | 3.8 | 1.8 | 2.4 | 3.0 |
| Spiral flow length (mm) | 460 | 480 | — | 560 | 510 |
| Craze formation time (sec) | 37 | 24 | — | 5 | 7 |
| Charpy impact strength (MD) (kJ/m$^2$) | 16.3 | 16.5 | — | 13.1 | 10.9 |
| Charpy impact strength (TD) (kJ/m$^2$) | 6.9 | 9.0 | — | 11.1 | 8.3 |
| Vicat softening temperature (° C.) | 111 | 108 | — | 105 | 107 |

According to the above results, it can be seen that the methacrylic resin composition of Example which satisfies all the requirements (1) to (4) was remarkably excellent in the Charpy impact strength as compared with the methacrylic resin composition of Comparative Example which does not satisfy any one of the requirements (1) to (4).

In addition, it can be seen that in the case of the methacrylic resin composition of Example, the craze formation time was 25 seconds or shorter, and the solvent resistance was excellent.

Furthermore, it can be seen that in the case of the methacrylic resin composition of Example, the spiral flow length was 430 mm or more, the Charpy impact strength was excellent, and the fluidity was also excellent.

In addition, according to the production method of Example which satisfies the requirements (11) and (12), it can be seen that methacrylic resin composition capable of implementing an excellent Charpy impact strength was produced.

What is claimed is:

1. A methacrylic resin composition comprising a methacrylic resin (A) and a methacrylic resin (B), and satisfying the following requirements (1) to (4):

(1) each of the methacrylic resin (A) and the methacrylic resin (B) has a structural unit derived from a methacrylic acid ester, and a content of the structural unit derived from the methacrylic acid ester contained in the methacrylic resin composition is 98.0% by mass or more with respect to a total content of 100% by mass of all structural units contained in the methacrylic resin composition;

(2) W1 is 10 to 25, in which W1 is a percentage of a peak area from a starting point to a molecular weight of 30,000 to a peak area from the starting point to an end point in a differential molecular weight distribution curve of the methacrylic resin composition;

(3) W2 is 3 to 9, in which W2 is a percentage of a peak area from a molecular weight of 300,000 to the end point to a peak area from the starting point to the end point in the differential molecular weight distribution curve of the methacrylic resin composition; and (4) a ratio (Mw/Mn) of a mass average molecular weight of the methacrylic resin composition to a number average molecular weight of the methacrylic resin composition is 2.0 to 3.2.

2. The methacrylic resin composition according to claim 1, wherein a ratio (Mw/Mn) of the mass average molecular weight of the methacrylic resin composition to the number average molecular weight of the methacrylic resin composition is 2.4 to 3.2.

3. The methacrylic resin composition according to claim 1, wherein a content of one of the methacrylic resin (A) and the methacrylic resin (B) and a content of the other of the methacrylic resin (A) and the methacrylic resin (B) are 25% by mass to 35% by mass and 65% by mass to 75% by mass, respectively,
with respect to a total content of 100% by mass of the methacrylic resin (A) and the methacrylic resin (B).

4. The methacrylic resin composition according to claim 1, wherein the methacrylic acid ester is methyl methacrylate.

5. The methacrylic resin composition according to claim 1, wherein each of the methacrylic resin (A) and the methacrylic resin (B) has a structural unit derived from an acrylic acid ester.

6. The methacrylic resin composition according to claim 5, wherein the acrylic acid ester is methyl acrylate.

7. A molded article comprising the methacrylic resin composition according to claim 1.

8. A method of producing the methacrylic resin composition according to claim 1, the method comprising:
a first polymerization step of feeding, to a first complete mixing reaction tank, a raw material composition (A) containing a raw material monomer (A) containing 98.0% by mass or more of a methacrylic acid ester, a polymerization initiator (A), and a chain transfer agent (A), subjecting the raw material composition (A) to continuous bulk polymerization in the first complete mixing reaction tank, and extracting, from the first complete mixing reaction tank, an intermediate composition (A) obtained thereby; and
a second polymerization step of feeding, to a second complete mixing reaction tank, a raw material composition (B) containing a raw material monomer (B) containing 98.0% by mass or more of a methacrylic acid ester, a polymerization initiator (B), and a chain transfer agent (B), and the intermediate composition (A) extracted in the first polymerization step, further subjecting the raw material composition (B) and the intermediate composition (A) to continuous bulk polymerization in the second complete mixing reaction tank, and extracting, from the second complete mixing reaction tank, a methacrylic resin composition obtained thereby, the method satisfying the following requirements (11) and (12):

$$1.5 \leq LA/LB \leq 1.9; \text{ and} \quad (11)$$

$$0.5 \leq SB/SA \leq 2.5, \quad (12)$$

wherein
LA represents a concentration (% by mass) of the polymerization initiator (A) in the raw material composition (A),
LB represents a concentration (% by mass) of the polymerization initiator (B) in a mixture of the raw material composition (B) and the intermediate composition (A),
SA represents a concentration (% by mass) of the chain transfer agent (A) in the raw material composition (A), and
SB represents a concentration (% by mass) of the chain transfer agent (B) in the mixture of the raw material composition (B) and the intermediate composition (A).

9. The method according to claim 8, further satisfying the following requirements (13) and (14):

$$25 \geq \theta 1 \geq 45; \text{ and} \quad (13)$$

$$10 \leq \theta 2 \leq 25, \text{ wherein} \quad (14)$$

θ1 represents a retention time (min) in the first complete mixing reaction tank in the first polymerization step, and
θ2 represents a retention time (min) in the second complete mixing reaction tank in the second polymerization step.

* * * * *